Mar. 6, 1923.
D. LEISSLER
ENAMELING OVEN
Filed Oct. 27, 1920
1,447,795
2 sheets-sheet 1
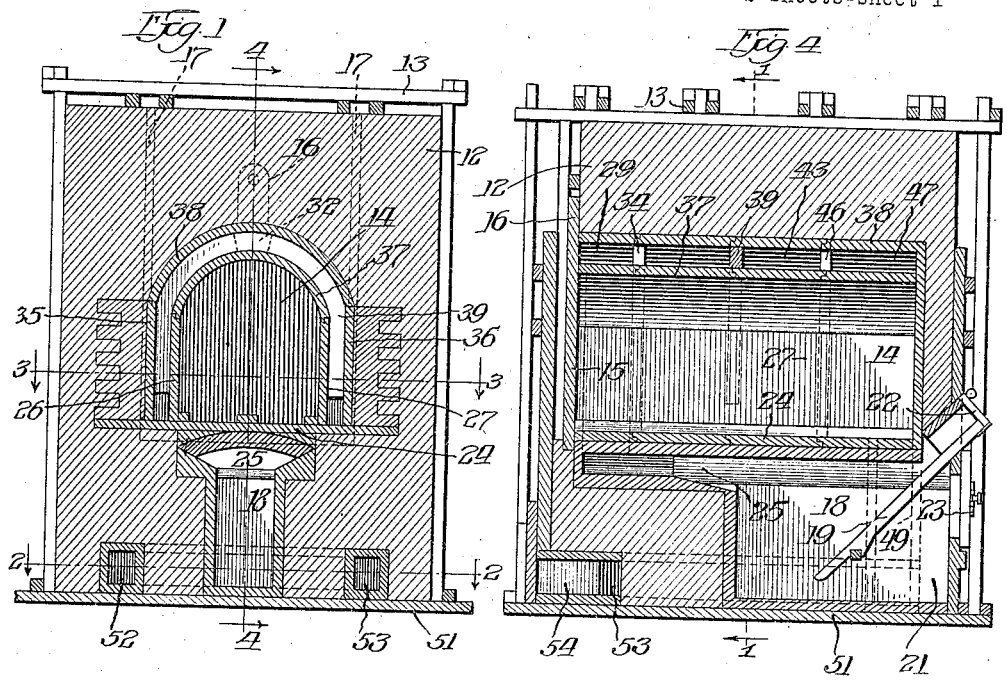
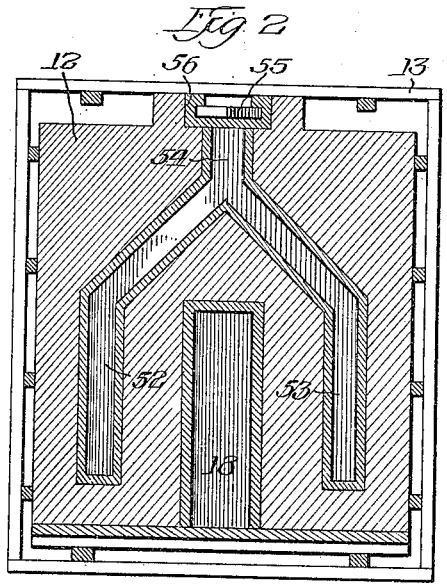
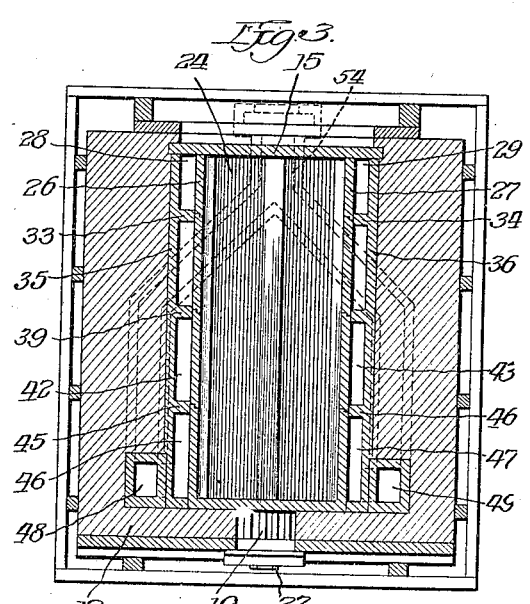
Inventor:
Daniel Leissler,
By H. G. Rockwell

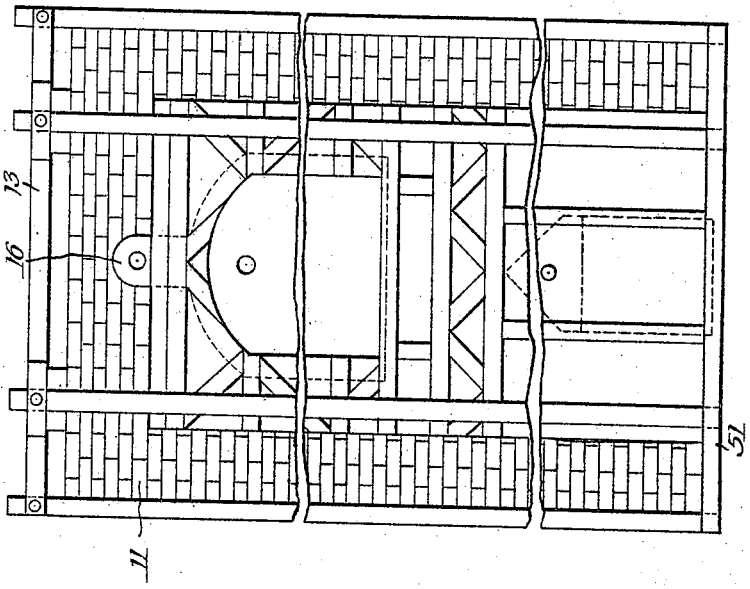
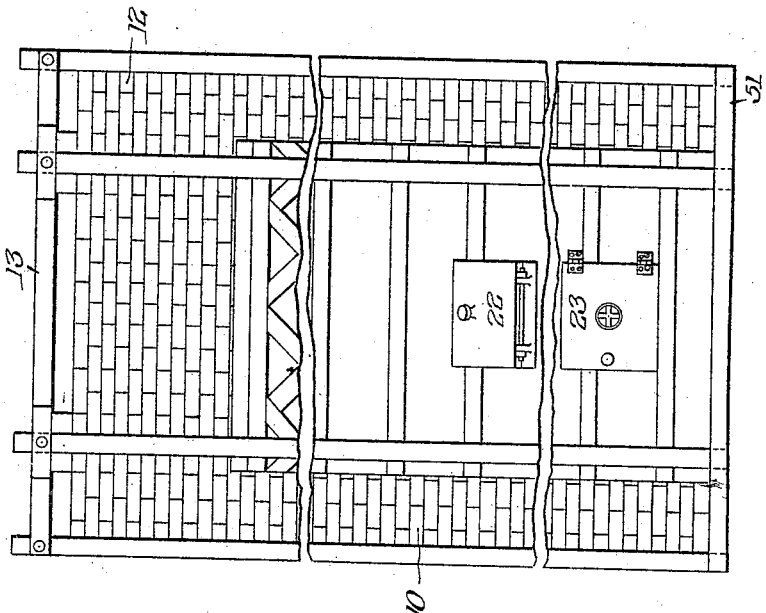

Patented Mar. 6, 1923.

1,447,795

UNITED STATES PATENT OFFICE.

DANIEL LEISSLER, OF CHICAGO, ILLINOIS.

ENAMELING OVEN.

Application filed October 27, 1920. Serial No. 419,825.

*To all whom it may concern:*

Be it known that I, DANIEL LEISSLER, a citizen of the United States, residing at Chicago, in the county of Cook and State of Illinois, have invented certain new and useful Improvements in Enameling Ovens, of which the following is a specification.

This invention relates in general to ovens and has more particular reference to enameling ovens adapted for baking enamel on bath tubs and other vitreous ware.

One of the primary objects of my invention is the provision of an oven of the character indicated which will be compact in structure and of reasonable cost in manufacture and which will produce and maintain a uniform temperature throughout the entire area of the oven so as to result in an even and uniform baking to produce a perfectly enameled and glazed article.

For the purpose of facilitating an understanding of the invention, I have illustrated in the accompanying drawings one preferred embodiment thereof, from an inspection of which, when considered in connection with the following description, my invention and many of its inherent advantages may be readily understood and appreciated.

Referring to the drawings—

Fig. 1 is a vertical transverse sectional view through an oven embodying my invention, this view being taken substantially on the line 1—1 of Fig. 4;

Fig. 2 is a horizontal sectional view on the line 2—2 of Fig. 1;

Fig. 3 is a horizontal sectional view on the line 3—3 of Fig. 1;

Fig. 4 is a longitudinal sectional view on the line 4—4 of Fig. 1; and

Figs. 5 and 6 are front and rear elevations respectively of an oven embodying my invention.

Referring now to the drawings more in detail, reference character 10 indicates generally the front and reference character 11 the rear end of my improved oven. The body proper indicated by reference 12 is composed of brickwork held together by an exterior frame 13 of any suitable construction and within this brickwork is contained the baking chamber 14 and the other associated parts of the oven. This baking chamber 14 extends longitudinally of the oven in horizontal position and the article or articles to be baked therein are inserted and removed through a doorway at the rear closed by a vertically slidable door 15 provided with an upward extension 16 to which counterweights (not shown) are attached, the door being guided in its vertical movements by guideways 17.

A fire box 18 located beneath the forward portion of the baking oven is provided with grates 19 disposed at an angle, as shown in Fig. 4, which serve to divide the fire box so as to provide the ash pit 21 in the lower forward portion thereof. The coal or other fuel is introduced into the fire box through the firing door 22 at the front of the oven, and the ashes are removed in the customary manner through the ash pit door 23 disposed beneath the firing door. The inclined position of the grates 19 serves to hold the burning fuel in elevated position, permitting the free passage of air therethrough, while the termination of their lower ends at a point remote from the ash pit floor, as will be evident from Fig. 4, permits the clinkers and slag to drop to the bottom of the fire box and into the ash pit, from which they are readily removable.

The products of combustion from the fire box, including the hot gases, rise against the forward portion of the floor 24 of the baking chamber and flow rearwardly along substantially the entire length of the floor through a horizontal flue 25 to the rear end of the floor where they divide, passing up the opposite sides 26 and 27 of the baking chamber through the vertical flues 28 and 29 respectively until they reach the crown or apex of the baking chamber 14. Here the hot gases from the flues 28 and 29 meet and commingle above the arch of the baking chamber at the rear end thereof, and from this point they pass horizontally forwardly along the crown of the baking chamber through an aperture 32 formed by a pair of vertically disposed partitions 33 and 34 which begin at the level of the floor 24 of the baking oven and extend upwardly between the walls of the baking chamber proper and the walls of the surrounding shell to a point near the crown of the oven. It is understood of course that the baking chamber proper comprises the side walls 26 and 27 and the arched roof 37, the surrounding shell spaced therefrom comprising the sides 35 and 36 and the arched roof 38. The partitions 33 and 34 extend from the baking chamber walls to the outer shell 38 and divide the space into the flues just described for the hot gases.

After passing forwardly between the spaced upper ends of the partitions 33 and 34 the gases are divided and deflected downwardly from the roof and sides of the baking chamber by a partition 39 which is of inverted U-shape and extends over the crown of the baking chamber and downwardly on both sides thereof and terminates some little distance above the floor level of the baking chamber, as will be apparent from Figs. 1 and 4. The hot gases flowing downwardly in the flues or passages between the partition 39 and the forwardly disposed partitions 33 and 34 flow rearwardly beneath the lower ends of the partitions 39 and rise upwardly on opposite sides of the baking chamber through the flues 42 and 43, commingling again above the crown of the baking chamber, and pass forwardly between the spaced ends of partitions 45 and 46 similar in all respects to the partitions 33 and 34 previously described. The hot gases now pass downwardly again on opposite sides of the baking chamber through the flues 46 and 47 at the forward end thereof and at the bottom of these flues they flow horizontally outwardly into a pair of vertically disposed flues 48 and 49. These flues extend downwardly to the floor 51 of the oven, where they communicate with the forward ends of a pair of floor flues 52 and 53 respectively, best shown in Figs. 2 and 4. These floor flues extend rearwardly along the bottom of the oven and intersect near the rear end thereof to form a short flue 54 which is controlled by a damper 55, the flue 54 being extended through the rear wall 56 of the oven and connected with a smokestack or chimney of any suitable construction (not shown).

It will be manifest therefore that on each side of the central vertically longitudinal plane of the baking chamber 14 the space above the exterior of this chamber is divided into four sets of flues so that the hot gases are conducted over the entire roof and sides of the baking chamber and are prevented from short circuiting from the upper rear apex of the chamber directly to the lower forward portion thereof. This feature in connection with the arrangement whereby the hot gases heat the entire floor of the baking chamber results in the production of a very uniform heat throughout the chamber. Also the arrangement whereby the hot gases after leaving the baking chamber pass to the chimney through conduits positioned at the bottom of the oven in brickwork 12 insures that a great amount of heat passes from the flues 52, 53 and 54 upwardly to the brickwork to keep the latter heated and thus further assist in maintaining a uniform temperature within the oven.

It is believed that my invention, its construction, mode of operation and many of its attendant advantages will be understood and appreciated from the foregoing without further description, but it should be obvious that the invention may be embodied in ovens differing materially in their details of construction without departing from the spirit of the invention as defined in the following claims.

I claim:

1. In an enameling oven, the combination with vertical side walls and a roof defining a baking chamber, an outer shell surrounding said walls and roof and spaced therefrom, and common front and rear walls and a common floor for said chamber and shell, of a pair of side partitions rising from said floor within the space between the baking chamber and shell between said front wall and the rear wall and terminating near the apex of said space at points remote from each other, a single partition extending from the apex of said space between said front and rear walls, traversing the space between the baking chamber and shell downwardly on opposite sides of said chamber and terminating remote from said floor, a pair of partitions similar to those first named positioned between said single partition and the rear wall, dividing the space between the baking chamber and shell from said floor to a point near the apex of said space and terminating short of each other, a fire box beneath the front end of the chamber, a passage leading from the fire box beneath said chamber to the rear end of the series of flues formed by the preceding named parts, and chimney connections communicating with the forward ends of said series of flues.

2. In an enameling oven, the combination of a baking chamber, an exterior shell surrounding the same and spaced therefrom, a fire box beneath said chamber, a grate therein disposed at an incline with its lower end spaced from the floor of the fire box, a passage for conducting the products of combustion from said fire box beneath said chamber, to a point near the rear end thereof, passages for conducting said products upwardly at opposite sides of the chamber to the top thereof, thence forwardly and downwardly at opposite sides of the chamber, thence forwardly and upwardly at opposite sides of the chamber to the top thereof, thence forwardly and downwardly at opposite sides of the chamber to points at opposite sides of the fire box, flues extending along said fire box rearwardly, and an exhaust flue into which said flues discharge.

3. In an enameling oven, the combination of a fire box, a baking chamber above said fire box, an exterior shell surrounding said chamber and spaced therefrom, partitions disposed between said shell and said chamber providing in conjunction with the shell and chamber a continuous conduit extending successively upwardly and downwardly along the walls of the chamber, means extending beneath the baking chamber for supplying products of combustion to one end of said conduit beneath the baking chamber, flues at opposite sides of the fire box for conducting said products of combustion rearwardly, and an exhaust flue into which said flues discharge.

DANIEL LEISSLER.